US011228820B2

(12) United States Patent
North et al.

(10) Patent No.: US 11,228,820 B2
(45) Date of Patent: Jan. 18, 2022

(54) GENERATING AND/OR ENCODING ROTATIONAL DATA FOR A MECHANICAL ELEMENT OVER A DIGITAL NETWORK

(71) Applicant: General Electric Company, Schenectady, NY (US)

(72) Inventors: Timothy Robert North, Fordingbridge (GB); Tod Alexander Gilbert, Marlborough (GB); Steven Bonnett, Sandown (GB)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/980,018

(22) Filed: May 15, 2018

(65) Prior Publication Data

US 2018/0338192 A1 Nov. 22, 2018

(30) Foreign Application Priority Data

May 16, 2017 (GB) .................................. 1707854

(51) Int. Cl.
*H04L 12/26* (2006.01)
*H04Q 9/00* (2006.01)
(Continued)

(52) U.S. Cl.
CPC ............... *H04Q 9/00* (2013.01); *G01P 3/481* (2013.01); *G01P 3/486* (2013.01); *G01P 3/487* (2013.01); *G01P 3/488* (2013.01); *H04L 67/12* (2013.01); *H04W 84/18* (2013.01); *G08C 2201/93* (2013.01); *H04Q 2209/823* (2013.01);
(Continued)

(58) Field of Classification Search
CPC ............................... H04L 67/12; H04W 84/18
See application file for complete search history.

(56) References Cited

U.S. PATENT DOCUMENTS

| 4,894,787 A | 1/1990 | Flannelly et al. |
| 5,249,470 A | 10/1993 | Hadley et al. |

(Continued)

FOREIGN PATENT DOCUMENTS

| CN | 102645243 A | 8/2012 |
| CN | 102840880 A | 12/2012 |

(Continued)

OTHER PUBLICATIONS

Combined Search and Examination Report dated Nov. 10, 2017 in connection with corresponding GB Application 1707854.4.

(Continued)

*Primary Examiner* — Bo Hui A Zhu
(74) *Attorney, Agent, or Firm* — Amin, Turocy & Watson, LLP

(57) ABSTRACT

Systems and techniques to facilitate generating and/or encoding rotational data associated with a mechanical element are presented. A sensor system can measure rotational speed data and phase data associated with a mechanical element that rotates. The sensor system can also encode the rotational speed data and phase data into a digital data packet. Furthermore, the sensor system can transmit the digital data packet associated with the rotational speed data and phase data to one or more sensor devices in communication with the sensor system.

19 Claims, 12 Drawing Sheets

(51) Int. Cl.

| | |
|---|---|
| *G01P 3/487* | (2006.01) |
| *G01P 3/486* | (2006.01) |
| *H04W 84/18* | (2009.01) |
| *G01P 3/488* | (2006.01) |
| *G01P 3/481* | (2006.01) |
| *H04L 29/08* | (2006.01) |

(52) U.S. Cl.
CPC ... *H04Q 2209/84* (2013.01); *H04Q 2209/845* (2013.01); *H04Q 2213/13174* (2013.01)

(56) References Cited

U.S. PATENT DOCUMENTS

| | | | |
|---|---|---|---|
| 6,230,110 | B1 | 5/2001 | Iwazaki |
| 6,611,755 | B1 | 8/2003 | Coffee et al. |
| 7,133,801 | B2 | 11/2006 | Song |
| 7,328,130 | B2 | 2/2008 | Wiles et al. |
| 7,591,183 | B2 | 9/2009 | King |
| 2004/0186680 | A1 | 9/2004 | Jin et al. |
| 2005/0111009 | A1 | 5/2005 | Keightley et al. |
| 2009/0319232 | A1 | 12/2009 | Griessler et al. |
| 2012/0209578 | A1 | 8/2012 | Stevens et al. |
| 2013/0211737 | A1 | 8/2013 | Batcheller et al. |
| 2014/0081593 | A1* | 3/2014 | Hess .................. G01M 13/045 702/145 |
| 2015/0312350 | A1* | 10/2015 | Kauppila .............. H04J 3/0638 709/248 |
| 2016/0146646 | A1 | 5/2016 | Willis et al. |
| 2017/0052062 | A1 | 2/2017 | Jia et al. |
| 2017/0059603 | A1 | 3/2017 | Zabulon et al. |
| 2017/0067860 | A1 | 3/2017 | Grabill et al. |

FOREIGN PATENT DOCUMENTS

| | | |
|---|---|---|
| CN | 103558407 A | 2/2014 |
| CN | 104487808 A | 4/2015 |
| CN | 105067248 A | 11/2015 |
| CN | 105634718 A | 6/2016 |
| CN | 106405142 A | 2/2017 |
| EP | 0004476 A1 | 10/1979 |
| EP | 2180295 A1 | 4/2010 |
| KR | 10-2007-0050606 A | 5/2007 |
| WO | 1997011872 A1 | 4/1997 |
| WO | 2013115716 A1 | 8/2013 |

OTHER PUBLICATIONS

Partial European Search Report received for EP Patent Application Serial No. 18171702.6 dated Nov. 9, 2018, 14 pages.
Extended European Search Report received for EP Patent Application Serial No. 18171702.6 dated Feb. 12, 2019, 14 pages.
Communication pursuant to Rule 69 EPC received for EP Patent Application Serial No. 18171702.6 dated Mar. 18, 2019, 2 pages.
Notification of Reason for Refusal received for Korean Patent Application Serial No. 10-2018-0055411 dated Aug. 30, 2019, 7 pages (Including English Translation).
First Office Action received for Chinese Patent Application Serial No. 201810467081.4 dated Apr. 30, 2020, 34 pages. (Including English Translation).
Saimurugan et al., "Multi component fault diagnosis of rotational mechanical system basedon decision tree and support vector machine", Expert Systems with Applications vol. 38, 2011, pp. 3819-3826.
Communication pursuant to Rule 94(3) EPC received for EP Patent Application Serial No. 18171702.6 dated Oct. 23, 2020, 9 pages.
Notification of Final Rejection received for Korean Patent Application Serial No. 10-2018-0055411 dated Oct. 12, 2020, 2 pages (Including English Translation).
Examination Report Received for Germany Patent Application Serial No. 1707854.4 dated Sep. 21, 2020, 3 Pages.
Second Office Action received for Chinese Patent Application Serial No. 201810467081.4 dated Apr. 6, 2021, 23 pages. (Including English Translation).
Third Office Action received for Chinese Patent Application Serial No. 201810467081.4 dated Sep. 16, 2021,26 pages. (Including English Translation).
Examination Report Received for Germany Patent Application Serial No. 1707854.4 dated Sep. 10, 2021, 2 Pages.

* cited by examiner

US 11,228,820 B2

GENERATING AND/OR ENCODING ROTATIONAL DATA FOR A MECHANICAL ELEMENT OVER A DIGITAL NETWORK

FIELD OF INVENTION

This disclosure relates generally to monitoring and/or generating rotational data associated with a mechanical element.

BACKGROUND OF THE INVENTION

A tachometer is a device that measures rotation speed of a rotating mechanical element. A tachometer generally displays the rotational speed via an analog dial or a digital display. For further processing, a tachometer can generally transmit an analog signal that includes one or more measurements of the rotating mechanical element to a central processing unit. However, processing of the analog signal by the central processing unit is generally prone to reduced performance and/or processing failures. Moreover, the analog signal processed by the central processing unit is generally susceptible to noise.

SUMMARY OF THE INVENTION

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an example aspect, a system includes an analog measurement component, an encoder component and a communication component. The analog measurement component measures rotational speed data and phase data associated with a mechanical element that rotates. The encoder component encodes the rotational speed data and phase data into a digital data packet. The communication component transmits the digital data packet associated with the rotational speed data and phase data to one or more sensor devices in communication with the sensor system.

According to another aspect, a method is provided. The method includes capturing, by a system comprising a processor, a set of rotational measurements associated with a rotating mechanical element. The method also includes encoding, by the system, the set of rotational measurements into a digital data packet. Furthermore, the method includes transmitting, by the system, the digital data packet associated with the set of rotational measurements to one or more sensor devices in communication with the system.

In accordance with another aspect, a computer readable storage device comprising instructions that, in response to execution, cause a system comprising a processor to perform operations, comprising: measuring rotational data associated with a rotating mechanical element, encoding the rotational data into a digital data packet, and transmitting the digital data packet that includes the rotational data to one or more sensor devices in communication with the system.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
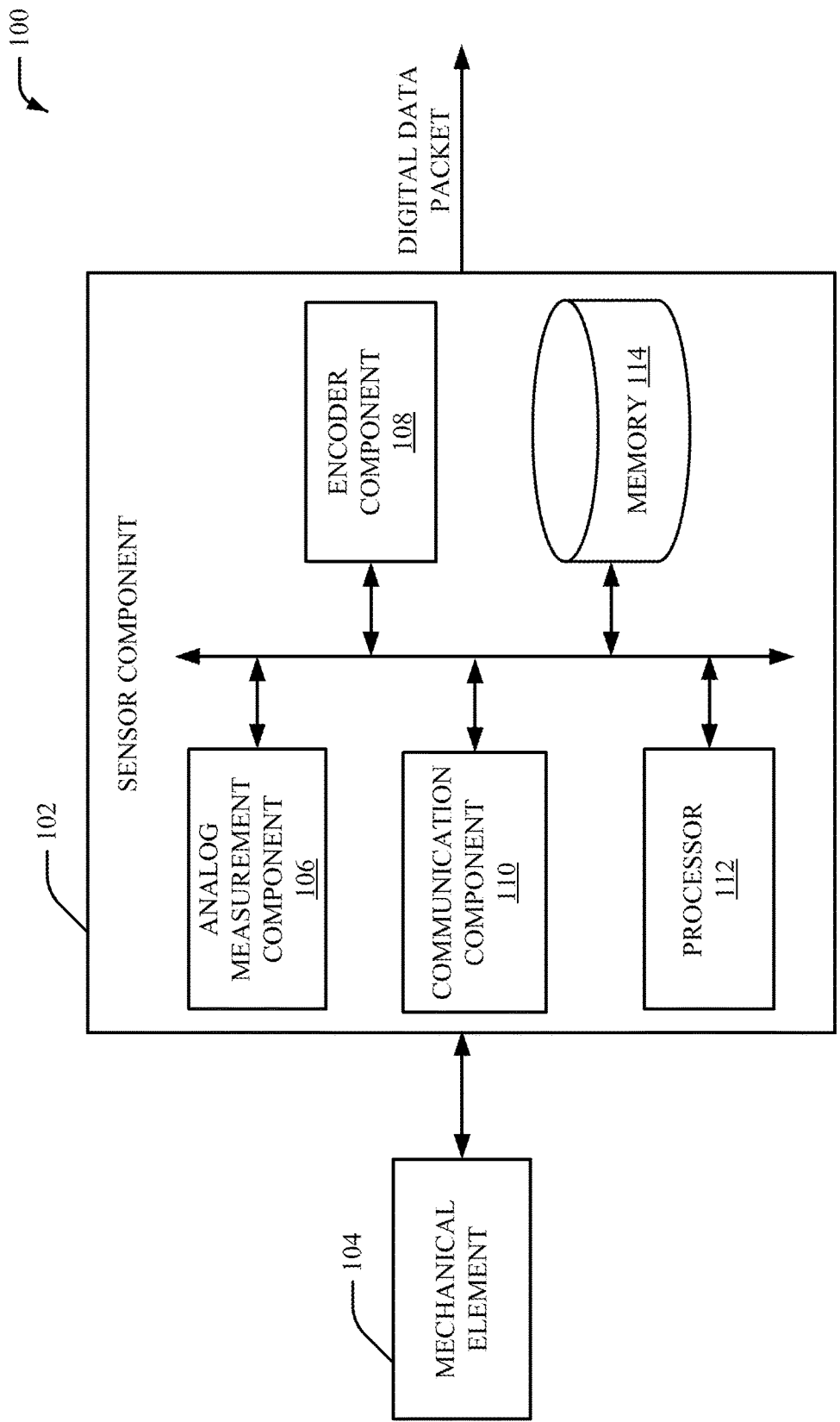
FIG. 1 illustrates a high-level block diagram of an example sensor component, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Systems and techniques for generating and/or encoding rotational data associated with a mechanical element are presented. For example, a device that monitors rotational frequency and/or rotational phase of a rotating mechanical element can provide frequency information and/or phase information to a plurality of distributed sensors via a digital network. The plurality of distributed sensors can employ the frequency information and/or phase information for further processing of data associated with the rotating mechanical element. In an aspect, the rotational frequency and/or rotational phase of the rotating mechanical element can be captured as analog data. Furthermore, the rotational frequency and/or rotational phase can be encoded into a digital data packet that is transmitted to the plurality of distributed sensors via digital data over a digital network. In one example, a set of reference point measurements associated with the rotating mechanical element can be encoded into a digital data packet that is transmitted to the plurality of distributed sensors via a digital network. Compared to a conventional analog tachometer system, the digital data packet associated with the frequency information and/or phase information can provide improved accuracy and/or greater adaptability for calculating rotational data associated with a rotating mechanical element. As such, earlier indications of a failure associated with a rotating mechanical element can be realized and/or a number of false failure alerts associated with the rotating mechanical element can be reduced. Therefore, maintenance associated with the rotating mechanical element can also be reduced and/or availability of the rotating mechanical element can also be improved. Moreover, failures associated with a sensor system (e.g., a tachometer sensor system) can be reduced and/or noise associated with rotational data for a rotating mechanical element can be minimized. Synchronization of data transmitted between a plurality of distributed sensors and/or modeling of a rotating mechanical element can also be improved.

Referring initially to FIG. 1, there is illustrated an example system 100 that generates and/or encodes rotational data associated with a mechanical element, according to an aspect of the subject disclosure. The system 100 can be implemented on or in connection with a network of sensors (e.g., a network of sensors associated with an enterprise application). The system 100 can be employed by various systems, such as, but not limited to monitoring systems (e.g., synchronous vibration monitoring systems), sensor systems, aviation systems, vehicle systems, health management systems, industrial systems, manufacturing systems, factory systems, energy management systems, power grid systems, water supply systems, transportation systems, healthcare systems, refinery systems, and the like. In one example, the system 100 can be associated with a digital prognostics system and/or a digital diagnostics system. Moreover, the system 100 and/or the components of the system 100 can be employed to use hardware and/or software to solve problems that are highly technical in nature (e.g., related to sensor devices, related to digital data processing, related to digital data analytics, related to machines, etc.), that are not abstract and that cannot be performed as a set of mental acts by a human.

The system 100 can include a sensor component 102. The sensor component 102 can be communicatively coupled to a mechanical element 104. In FIG. 1, the sensor component 102 includes an analog measurement component 106, an encoder component 108 and a communication component 110. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The system 100 (e.g., the sensor component 102) can include memory 114 for storing computer executable components and instructions. The system 100 (e.g., the sensor component 102) can further include a processor 112 to facilitate operation of the instructions (e.g., computer executable components and instructions) by the system 100 (e.g., the sensor component 102).

The mechanical element 104 can be a mechanical element that rotates (e.g., the mechanical element 104 can be a rotating mechanical element). For instance, the mechanical element 104 can be a mechanical shaft (e.g., a crankshaft), a mechanical disk, or another mechanical component that rotates. In one example, the mechanical element 104 can rotate to facilitate transmission of power to a machine coupled to the mechanical element 104. The sensor component 102 can be associated with a sensor (e.g., a smart sensor) such as, for example, a tachometer sensor (e.g., a smart tachometer sensor). In an embodiment, the sensor component 102 can be integrated on the sensor. In another embodiment, the sensor component 102 can be contained within a device (e.g., an in-line device) in a physical wire between a sensor and a network (e.g., a digital network).

The analog measurement component 106, the encoder component 108 and/or the communication component 110 of the sensor component 102 can be employed to generate and/or encode rotational data associated with the mechanical element 104. In an embodiment, the analog measurement component 106 can measure rotational data associated with the mechanical element 104. The rotational data can be one or more analog measurements associated with rotation of the mechanical element 104. For example, the rotational data can include rotational speed data. The rotational speed data can include rotational frequency information for the mechanical element 104. For instance, the rotational speed data can be indicative of a speed of rotation of the mechanical element 104 (e.g., revolutions of the mechanical element 104 per unit time) with respect to a reference point associated with the mechanical element 104. Additionally or alternatively, the rotational data can include phase data. The phase data can be indicative of phase information for the mechanical element 104 with respect to the reference point associated with the mechanical element 104. In an embodiment, the analog measurement component 106 can determine a set of reference point measurements (e.g., a set of reference points) associated with the mechanical element 104 during a defined interval of time (e.g., a defined period of time). The set of reference point measurements can be measurements with respect to the reference point associated with the mechanical element 104. As such, the analog measurement component 106 can determine the set of reference point measurements based on a reference point (e.g., a phase reference point) associated with the mechanical element 104. For example, the analog measurement component 106 can recognize the reference point associated with the mechanical element 104 based on current induced in a coil by ferrous material. Passing of the ferrous material approximate to the coil can induce a pulse indicating the reference point associated with the mechanical element 104. In an aspect, a geometry of the ferrous material associated with the mechanical element 104 can induce n pulses per revolution with a phase reference provided by a double pulse or a triple pulse.

In another example, the analog measurement component 106 can recognize the reference point associated with the mechanical element 104 based on a wheel or a gear that induces pulses per revolution of the wheel or the gear. In yet another example, the analog measurement component 106 can recognize the reference point associated with the mechanical element 104 based on a gear (e.g., a phonic gear) with an indicator (e.g., a missing tooth of the gear, a tooth of a gear that comprises a different shape than other teeth of the gear, etc.) that provides the reference point associated with the mechanical element 104. In yet another example, the analog measurement component 106 can recognize the reference point associated with the mechanical element 104 based on an optical sensor associated with the sensor component 102 where light levels on the optical sensor correspond to a phase reference associated with a reflective patch on the mechanical element 104. In yet another example, the analog measurement component 106 can recognize the reference point associated with the mechanical element 104 based on electrical generator signal associated with the mechanical element 104. Furthermore, in an embodiment, the phase data can include the set of reference point measurements. The set of reference point measurements can be accumulated over a defined interval of time (e.g., a predetermined time period). For example, the set of reference point measurements can be accumulated since a previous transmission period associated with a previous set of reference point measurements associated with the mechanical element 104. In another embodiment, the analog measurement component 106 can measure the rotational data based on a clock signal. The clock signal can be provided to the sensor component 102 and the one or more sensor devices in communication with the sensor component 102. The clock signal can facilitate synchronization of processing between the sensor component 102 and the one or more sensor devices in communication with the sensor component 102.

The encoder component 108 can encode the rotational data (e.g., the one or more analog measurements) into a digital data packet (e.g., DIGITAL DATA PACKET shown in FIG. 1). For instance, the encoder component 108 can encode the rotational speed data and/or the phase data into the digital data packet. In one example, the encoder component 108 can encode the set of reference point measurements into the digital data packet. The rotational data (e.g., the rotational speed data, the phase data and/or the set of reference point measurements) can be encoded in the digital data packet as a block of data (e.g., a block of fixed size data) in the digital data packet. The digital data packet can also include other data such as, for example, clock signal data (e.g., timing data for the rotational data), an identifier associated with the mechanical element 104 and/or statistics associated with the rotational data and/or the mechanical element 104. In an aspect, the digital data packet can be formatted for transmission over a digital network. For instance, the digital data packet can be formatted for transmission over a wired digital network and/or a wireless digital network.

The communication component 110 can transmit the digital data packet. In one embodiment, the communication component 110 can transmit the digital data packet to one or more sensor devices in communication with the sensor component 102. The communication component 110 can transmit the digital data packet via a digital network (e.g., a wired digital network and/or a wireless digital network). In an embodiment, the communication component 110 can transmit the digital data packet to the one or more sensor devices based on control data received from a control device in communication with the sensor component 102 and/or one or more sensor devices in communication with the sensor component 102. In another embodiment, the communication component 110 can transmit diagnostic data that comprises at least the rotational data to a display device that displays the diagnostic data in a human interpretable format. For instance, in certain embodiments, the digital data packet can include the diagnostic data. The diagnostic data can be generated based on the rotational data. Furthermore, the diagnostic data can provide diagnostics and/or prognostics related to the mechanical element 104. In certain embodiments, the analog measurement component 106 can generate a tachometer pulse signal based on the rotational data. Furthermore, the communication component 110 can transmit the tachometer pulse signal to an analog measurement device.

While FIG. 1 depicts separate components in the sensor component 102, it is to be appreciated that two or more components may be implemented in a common component. Further, it can be appreciated that the design of system 100 and/or the sensor component 102 can include other component selections, component placements, etc., to facilitate generating and/or encoding rotational data.

Figure 2:
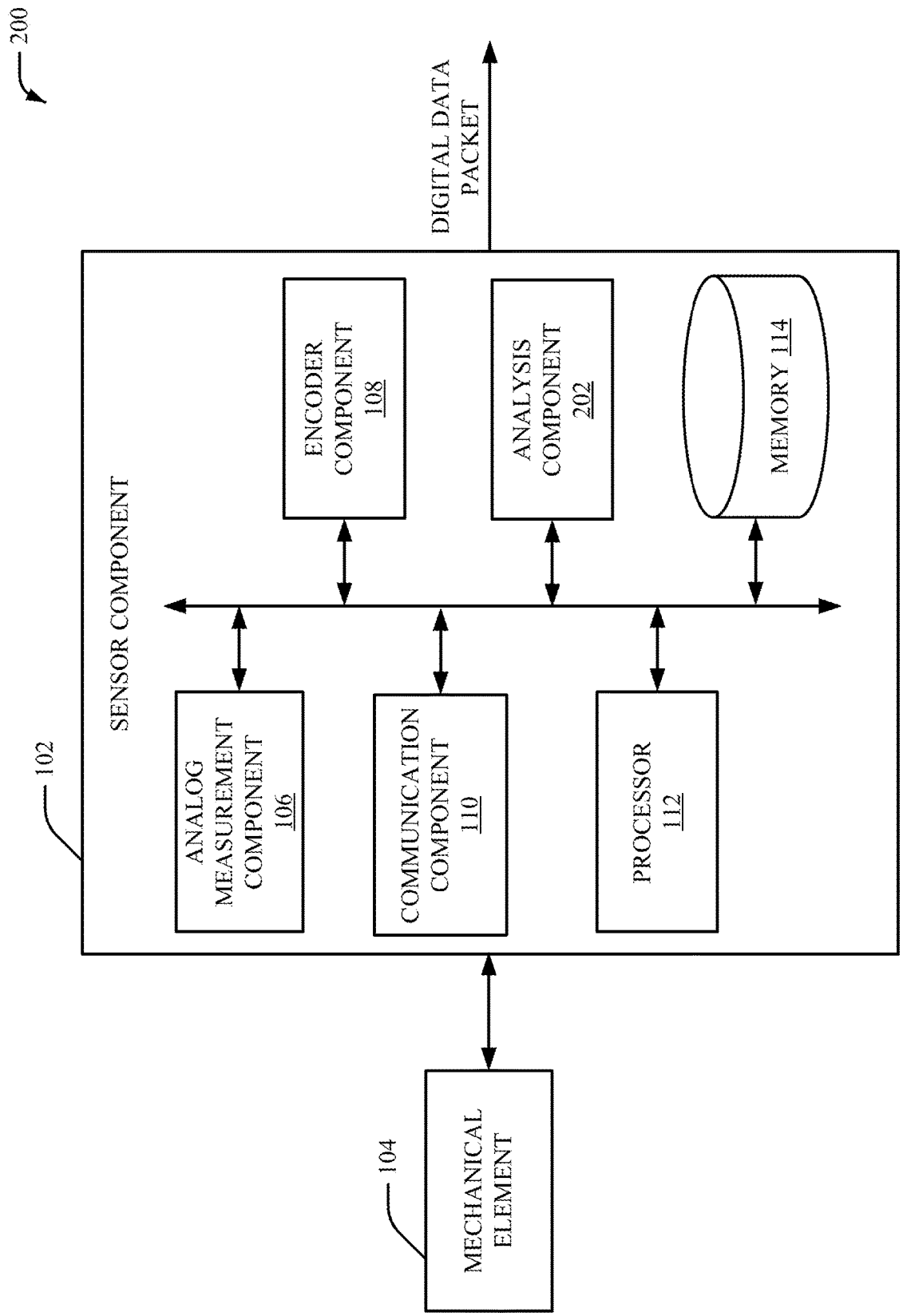
FIG. 2 illustrates a high-level block diagram of another example sensor component, in accordance with various aspects and implementations described herein.

Referring now to FIG. 2, there is illustrated a non-limiting implementation of a system 200 in accordance with various aspects and implementations of this disclosure. The system 200 can be employed by various systems, such as, but not limited to monitoring systems (e.g., synchronous vibration monitoring systems), sensor systems, aviation systems, vehicle systems, health management systems, industrial systems, manufacturing systems, factory systems, energy management systems, power grid systems, water supply systems, transportation systems, healthcare systems, refinery systems, and the like. In one example, the system 200 can be associated with a digital prognostics system and/or a digital diagnostics system. Moreover, the system 200 and/or the components of the system 200 can be employed to use hardware and/or software to solve problems that are highly technical in nature (e.g., related to sensor devices, related to digital data processing, related to digital data analytics, related to machines, etc.), that are not abstract and that cannot be performed as a set of mental acts by a human. The system 200 can include a sensor component 102. The system 200 can include the sensor component 102 and the mechanical element 104. In FIG. 2, the sensor component 102 includes the analog measurement component 106, the encoder component 108, the communication component 110, the processor 112, the memory 114 and an analysis component 202.

The analysis component 202 can generate analysis data based on analysis of the rotational data (e.g., the rotational speed data, the phase data and/or the set of reference point measurements). The analysis data can facilitate determination of network behavior associated with the sensor component 102 and/or one or more sensor devices in communication with the sensor component 102. Additionally or alternatively, the analysis data can facilitate diagnosing installation issues associated with the sensor component 102 and/or one or more sensor devices in communication with the sensor component 102. In an embodiment, the analysis component 202 can generate a snapshot of a digitized analog signal generated by the encoder component 108. For example, the snapshot of the digitized analog signal can be a set of digital rotational data for the mechanical element 104 that is associated with an interval of time (e.g., a beginning time value and an ending time value for capturing the rotational data). The snapshot of the digitized analog signal can facilitate improved real-time prognostics and/or diagnostics of the rotational data associated with the mechanical element 104. In an aspect, the analysis data can include configuration data and/or error checking data. For instance, the analysis component 202 can determine a rate of change of time between phase reference measurements included in the set of reference point measurements. The analysis component 202 can also determine whether the rate of change of time between the phase reference measurements exceed a defined threshold value. Additionally or alternatively, the analysis component 202 can calculate a magnitude of the rotational data. The analysis component 202 can also determine if the magnitude of the rotational data satisfies a defined criterion. For example, the analysis component 202 can determine if the magnitude of the rotational data is greater than or less than a defined threshold. Additionally or alternatively, the analysis component 202 can determine time periods between phase reference measurements included in the set of reference point measurements. The analysis component 202 can also determine whether a time period between phase reference measurements drops below a first defined threshold value (e.g., a minimum configurable limit) or exceed a second defined threshold value (e.g., a maximum configurable limit). In an embodiment, the communication component 110 can transmit the analysis data associated with the analysis component 202 to a display device in response to a determination that the analysis data (e.g., the rotational data) satisfies a defined criterion. In one example, the digital data packet can include the analysis data. In another example, the analysis data can be transmitted separate from the digital data packet.

In certain embodiments, the analysis component 202 can employ one or more artificial intelligence techniques and/or machine learning to generate the analysis data. In an aspect, the analysis component 202 can employ an automatic classification system and/or an automatic classification process to facilitate learning and/or generating inferences for the rotational data and/or the analysis data. For example, the analysis component 202 can employ a probabilistic and/or statistical-based analysis (e.g., factoring into the analysis utilities and costs) to learn and/or generate inferences for the rotational data and/or the analysis data. The analysis component 202 can employ, for example, a support vector machine (SVM) classifier to learn and/or generate inferences for the rotational data and/or the analysis data. Additionally or alternatively, the analysis component 202 can employ other classification techniques associated with Bayesian networks, decision trees and/or probabilistic classification models. Classifiers employed by the analysis component 202 can be explicitly trained (e.g., via a generic training data) as well as implicitly trained (e.g., via observing user behavior, receiving extrinsic information). For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class). The analysis component 202 can also employ, in certain implementations, historical data in addition to the rotational data to facilitate learning and/or generating inferences for the rotational data and/or the analysis data.

In an embodiment, the analysis component 202 can include an inference component that can further enhance automated aspects of the analysis component 202 utilizing in part inference based schemes to facilitate learning and/or generating inferences for the rotational data and/or the analysis data. The analysis component 202 can employ any suitable machine-learning based techniques, statistical-based techniques and/or probabilistic-based techniques. For example, the analysis component 202 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the analysis component 202 can perform a set of machine learning computations associated with the rotational data and/or the analysis data. For example, the analysis component 202 can perform a set of clustering machine learning computations, a set of decision tree machine learning computations, a set of instance-based machine learning computations, a set of regression machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations and/or a set of different machine learning computations.

While FIG. 2 depicts separate components in the sensor component 102, it is to be appreciated that two or more components may be implemented in a common component. Further, it can be appreciated that the design of system 200 and/or the sensor component 102 can include other component selections, component placements, etc., to facilitate generating and/or encoding rotational data.

Figure 3:
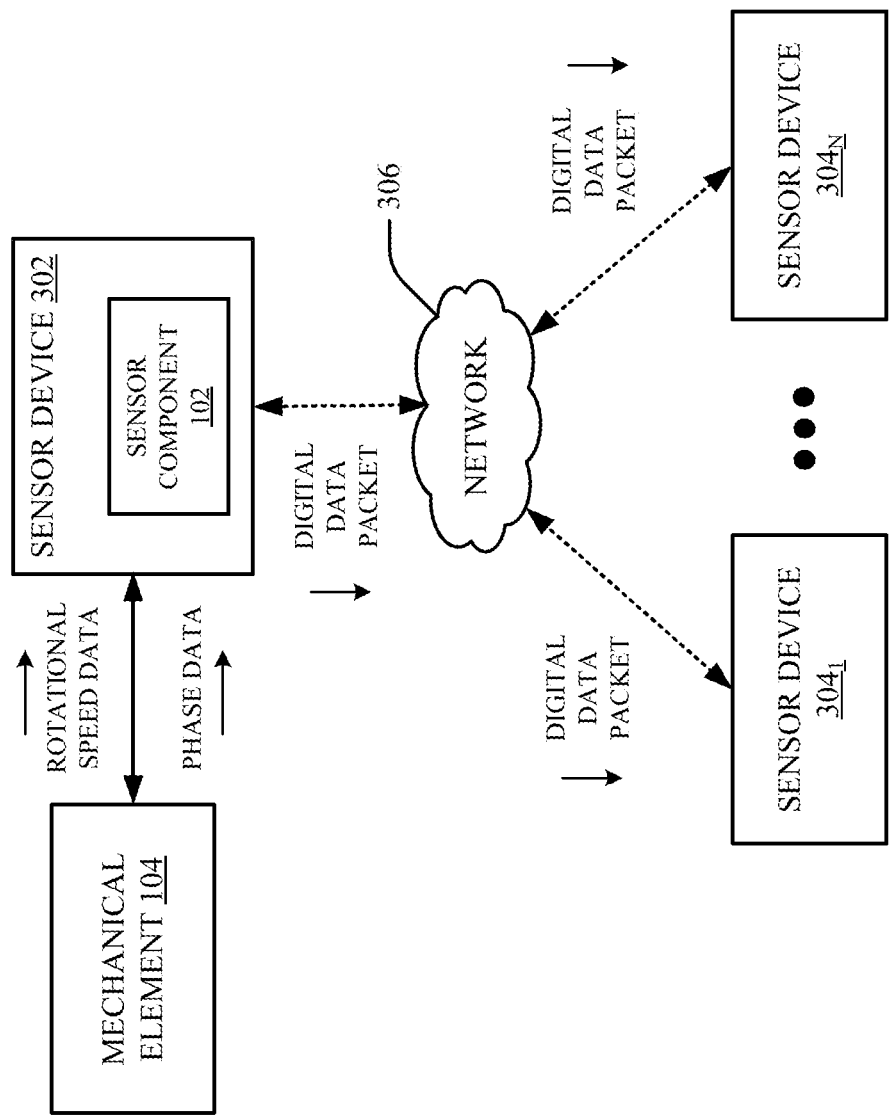
FIG. 3 illustrates an example system for generating and/or encoding rotational data associated with a mechanical element, in accordance with various aspects and implementations described herein.

Referring now to FIG. 3, there is illustrated a non-limiting implementation of a system 300 in accordance with various aspects and implementations of this disclosure. In a non-limiting embodiment, the system 300 can be a synchronous vibration monitoring systems. The system 300 includes the mechanical element 104, a sensor device 302 and one or more sensor devices 304$_{1-N}$. In an embodiment, the sensor device 302 can include the sensor component 102. For example, the sensor component 102 can be embedded on the sensor device 302. In an alternate embodiment, the sensor component 102 can be contained within a device (e.g., an in-line device) in a physical wire between the sensor device 302 and the network 306. Furthermore, the sensor device 302 (e.g., the sensor component 102 of the sensor device 302) can be communicatively coupled to the mechanical element 104. The sensor device 302 (e.g., the sensor component 102 of the sensor device 302) can also be in communication with the one or more sensor devices 304$_{1-N}$ via a network 306. The network 306 can be a wired network and/or a wireless network. Furthermore, the network 306 can be a digital network.

The sensor device 302 can be an electronic component (e.g., a sensor) that detects and/or measures rotational data associated with the mechanical element 104. For instance, the sensor device 302 can be a sensor device (e.g., a smart sensor) that acquires and/or processes one or more speed signals and/or one or more phase signals. Furthermore, the sensor device 302 can be implemented as a measuring device that combines acquisition elements and/or processing elements for the one or more speed signals and/or one or more phase signals into a single package. The sensor device 302 can provide the rotational data to the one or more sensor devices $304_{1-N}$ via the network 306 (e.g., via the digital data packet transmitted over a digital network). The one or more sensor devices $304_{1-N}$ can be electronic component(s) (e.g., sensor(s)) that detect and/or measure other data that is different than the rotational data associated with the mechanical element 104. For instance, the one or more sensor devices $304_{1-N}$ can be sensor device(s) (e.g., smart sensor(s)) that acquire and/or process one or more time domain signals associated with synchronous analysis and/or monitoring system processing (e.g., synchronous vibration monitoring system processing). Furthermore, the one or more sensor devices $304_{1-N}$ can be implemented as a measuring device that combines acquisition elements and/or processing elements for the one or more time domain signals into a single package. As such, the one or more sensor devices $304_{1-N}$ can receive rotational data with improved accuracy (e.g., an accurate phase reference) from the sensor device 302. In one example, the sensor device 302 can be a first type of sensor (e.g., a category 2 sensor) and the one or more sensor devices $304_{1-N}$ can be a second type of sensor (e.g., category 1 sensor(s)). In a non-limiting example, the sensor device 302 can be a tachometer sensor and the one or more sensor devices $304_{1-N}$ can be one or more accelerometer sensors.

In an embodiment, the sensor device 302 (e.g., the sensor component 102 of the sensor device 302) can obtain the rotational speed data (e.g., ROTATIONAL SPEED DATA shown in FIG. 3) and/or the phase data (e.g., PHASE DATA shown in FIG. 3) from the mechanical element 104. The rotational speed data and/or the phase data can be rotational data measured by the analog measurement component 106. Furthermore, the rotational speed data and/or the phase data can be associated with one or more time domain analogue signals obtained by the sensor device 302 (e.g., the sensor component 102 of the sensor device 302). Based on the rotational speed data and/or the phase data, the sensor device 302 (e.g., the sensor component 102 of the sensor device 302) can generate the digital data packet. For example, the sensor device 302 (e.g., the sensor component 102 of the sensor device 302) can encode the rotational speed data and/or the phase data into the digital data packet. Furthermore, the sensor device 302 (e.g., the sensor component 102 of the sensor device 302) can transmit the digital data packet (e.g., the digital data packet associated with the rotational speed data and/or the phase data) to the one or more sensor devices $304_{1-N}$ via the network 306. The one or more sensor devices $304_{1-N}$ can employ the digital data packet (e.g., the rotational speed data and/or the phase data encoded into the digital data packet) to perform further processing of data associated with the mechanical element 104.

Figure 4:
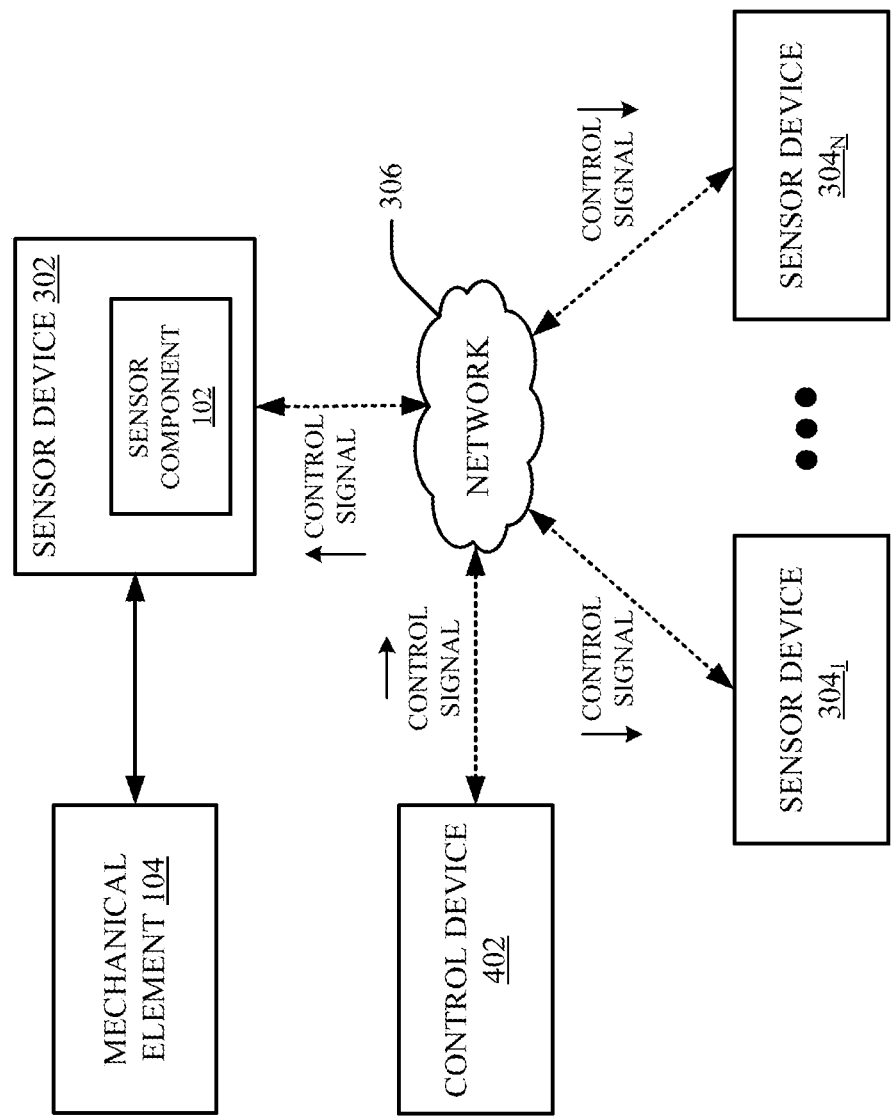
FIG. 4 illustrates another example system for generating and/or encoding rotational data associated with a mechanical element, in accordance with various aspects and implementations described herein.

Referring now to FIG. 4, there is illustrated a non-limiting implementation of a system 400 in accordance with various aspects and implementations of this disclosure. In a non-limiting embodiment, the system 400 can be a synchronous vibration monitoring systems. The system 400 includes the mechanical element 104, the sensor device 302, the one or more sensor devices $304_{1-N}$ and a control device 402. The sensor device 302 can include the sensor component 102. Furthermore, the sensor device 302 (e.g., the sensor component 102 of the sensor device 302) can be communicatively coupled to the mechanical element 104. The sensor device 302 (e.g., the sensor component 102 of the sensor device 302) and the one or more sensor devices $304_{1-N}$ can also be in communication with the control device 402 via the network 306.

The control device 402 can be, for example, a central control unit that controls one or more functions of the sensor device 302 (e.g., the sensor component 102 of the sensor device 302) and/or the one or more sensor devices $304_{1-N}$. For example, the sensor device 302 (e.g., the sensor component 102 of the sensor device 302) and the one or more sensor devices $304_{1-N}$ can be networked together, under control of the control device 402, to provide rotational information associated with the mechanical element 104 and/or to provide diagnostic coverage associated with the mechanical element 104. The control device 402 can generate a control signal (e.g., CONTROL SIGNAL shown in FIG. 4). The control device 402 can also transmit the control signal to the sensor device 302 (e.g., the sensor component 102 of the sensor device 302) and/or the one or more sensor devices $304_{1-N}$ via the network 306. For instance, the sensor device 302 (e.g., the analog measurement component 106 of the sensor component 102) can measure the rotational speed data and/or the phase data based on the control signal provided to the sensor device 302 and the one or more sensor devices $304_{1-N}$ via the network 306. In an embodiment, the control signal can be a clock signal. For instance, the control device 402 can transmit the clock signal to the sensor device 302 (e.g., the sensor component 102 of the sensor device 302) and/or the one or more sensor devices $304_{1-N}$ via the network 306. Furthermore, the sensor device 302 (e.g., the analog measurement component 106 of the sensor component 102) can measure the rotational speed data and/or the phase data based on the clock signal provided to the sensor device 302 and the one or more sensor devices $304_{1-N}$ via the network 306. The clock signal can be synchronized to a time reference (e.g., a common high resolution time reference), for example. In another embodiment, the control signal can be control data. For instance, the control device 402 can transmit the control data to the sensor device 302 (e.g., the sensor component 102 of the sensor device 302) and/or the one or more sensor devices $304_{1-N}$ via the network 306. Furthermore, the sensor device 302 (e.g., the communication component 110 of the sensor component 102) can transmit the digital data packet to the one or more sensor devices $304_{1-N}$ based on control data received from the control device 402.

Figure 5:
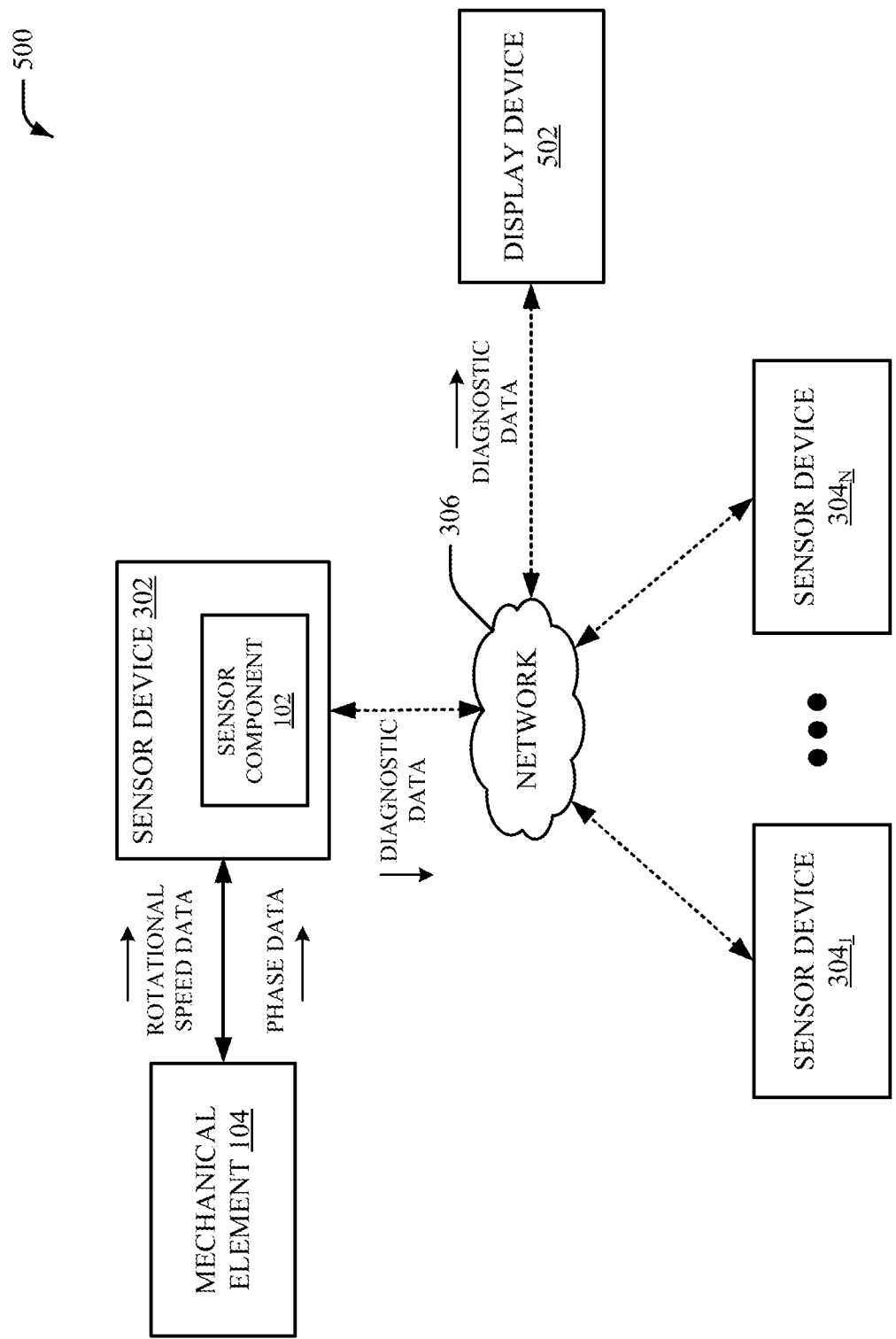
FIG. 5 illustrates yet another example system for generating and/or encoding rotational data associated with a mechanical element, in accordance with various aspects and implementations described herein.

Referring now to FIG. 5, there is illustrated a non-limiting implementation of a system 500 in accordance with various aspects and implementations of this disclosure. In a non-limiting embodiment, the system 500 can be a synchronous vibration monitoring systems. The system 500 includes the mechanical element 104, the sensor device 302, the one or more sensor devices $304_{1-N}$ and a display device 502. The sensor device 302 can include the sensor component 102. Furthermore, the sensor device 302 (e.g., the sensor component 102 of the sensor device 302) can be communicatively coupled to the mechanical element 104. The sensor device 302 (e.g., the sensor component 102 of the sensor device 302) and the one or more sensor devices $304_{1-N}$ can also be in communication with the display device 502 via the network 306.

The sensor device 302 (e.g., the communication component 110 of the sensor component 102) can generate diagnostic data (e.g., DIAGNOSTIC DATA shown in FIG. 5). The diagnostic data can include, for example, at least the rotational speed data and the phase data. In an embodiment, the diagnostic data can include information regarding abnormalities, patterns and/or events associated with the mechanical element 104. The abnormalities, patterns and/or events associated with the mechanical element 104 can be determined based on the rotational speed data and/or the phase data. In another embodiment, the diagnostic data can indicate whether the a value of the rotational speed data and/or the phase data is greater than a defined threshold. The sensor device 302 (e.g., the communication component 110 of the sensor component 102) can also transmit the diagnostic data (e.g., the diagnostic data that includes at least the rotational speed data and the phase data) to the display device 502 via the network 306. The display device 502 can display the diagnostic data via a display of the display device 502. For instance, the display device 502 can display the diagnostic data in a human interpretable format.

In an embodiment, the sensor device 302 (e.g., the communication component 110 of the sensor component 102) can a user interface, for display, that outputs the diagnostic data in a human interpretable format. The sensor device 302 (e.g., the communication component 110 of the sensor component 102) can render a display associated with the diagnostic data to the display device 502. The display device 502 can be associated with a display, a monitor, a user interface and/or a web browser. Furthermore, the display device 502 can be a computing device and/or can be included in a computing device such as, but not limited to, a smart device, a smart phone, a mobile device, a handheld device, a tablet, a computer, a desktop computer, a laptop computer, a monitor device, a portable computing device or another type of computing device. The display device 502 can render a user interface for presentation of the diagnostic data. For instance, a user interface rendered on the display device 502 can present content associated with the diagnostic data. In one example, the display device 502 can present one or more graphical elements associated with the diagnostic data. The one or more graphical elements can be in a human interpretable format to allow a user employing the display device 502 to interpret the diagnostic data. In one example, the diagnostic data can be presented graphically via the display device 502 in an easily comprehensible manner. The diagnostic data can be presented via the display device 502 as one or more alphanumeric characters, one or more graphics and/or one or more animations. Additionally or alternatively, diagnostic data can be presented via the display device 502 as audio data and/or video data. Furthermore, the diagnostic data can be static or updated dynamically to provide the diagnostic data in real-time as changes or events occur with respect to the mechanical element 104.

The display device 502 can display and/or facilitate display one or more display elements associated with the diagnostic data. In accordance with one aspect, a graphical element (e.g., a graphical representation) associated with the diagnostic data can form all or part of a complete display rendered on the display device 502. In addition to a graphical representation of the diagnostic data, one or more items can form part of a display of the display device 502. In one example, the display device 502 can generate a notification associated with the diagnostic data, a message associated with the diagnostic data, an icon associated with the diagnostic data, a thumbnail associated with the diagnostic data, a dialog box associated with the diagnostic data, a tool associated with the diagnostic data, a widget associated with the diagnostic data, a graph associated with the diagnostic data, and/or another display element associated with the diagnostic data. A graphical element associated with the diagnostic data can be transparent, translucent or opaque. A graphical element associated with the diagnostic data can also be various sizes, various colors, various brightness, and so forth as well as being animated (e.g., for fading in and out, etc.). In an embodiment, the display device 502 can additionally or alternatively present information regarding the mechanical element and/or a machine associated with the mechanical element 104 in a human interpretable format. In an embodiment, at least a portion of the network 306 can be a communication network, a wireless network, an IP network, a voice over IP network, an internet telephony network, a mobile telecommunications network and/or another type of network to facilitate communication between the display device 502 and the sensor device 302. In one example, the display device 502 (e.g., a user interface presented on the display device 502) can be integrated with a web-based application in communication with the sensor device 302 via the network 306. The web-based application can allow the diagnostic data to be visualized in human interpretable format. Furthermore, the web-based application can allow a user to monitor and/or analyze the rotational speed data, the phase data and/or the mechanical element 104.

Figure 6:
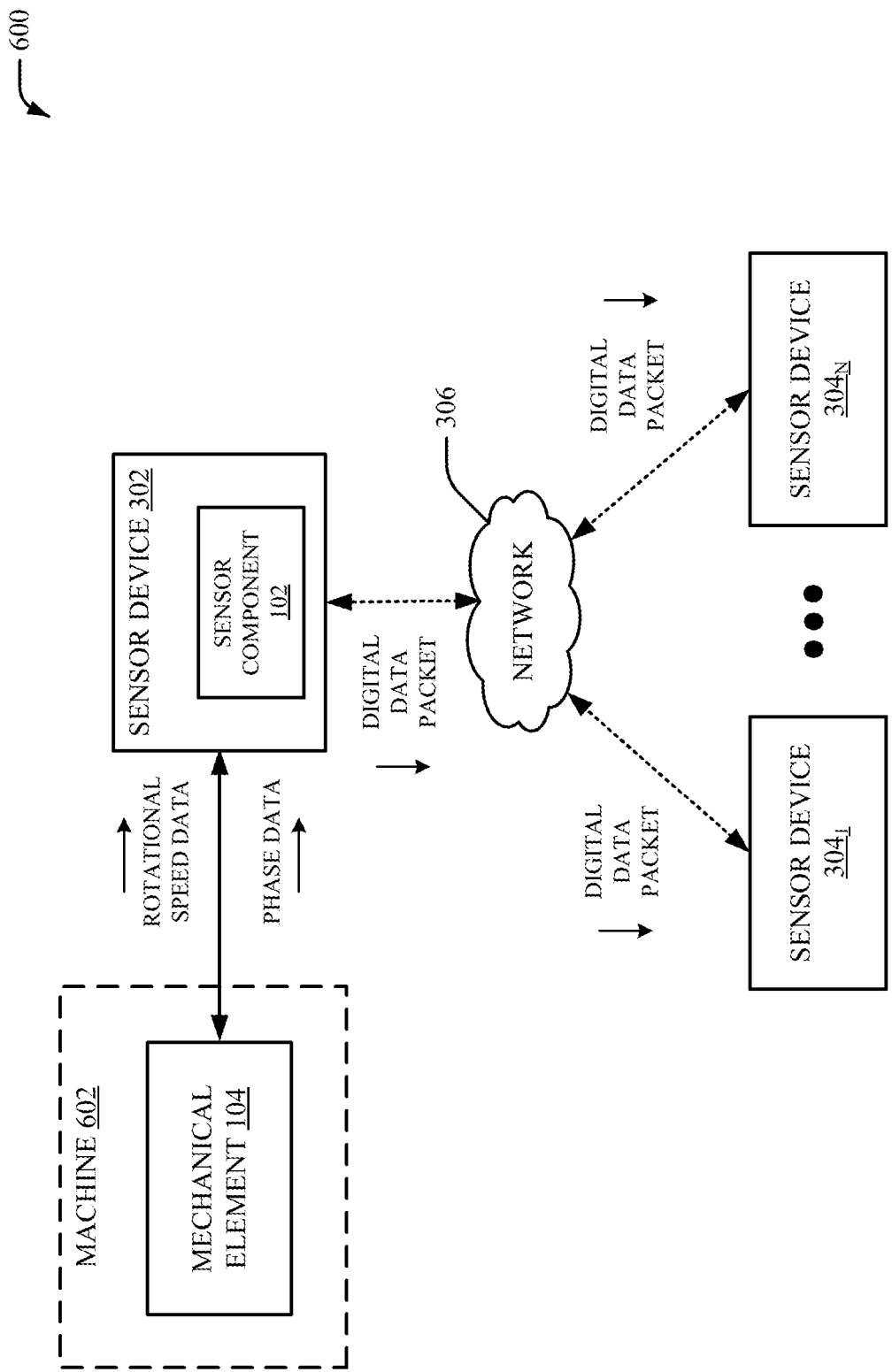
FIG. 6 illustrates yet another example system for generating and/or encoding rotational data associated with a mechanical element, in accordance with various aspects and implementations described herein.

Referring now to FIG. 6, there is illustrated a non-limiting implementation of a system 600 in accordance with various aspects and implementations of this disclosure. In a non-limiting embodiment, the system 600 can be a synchronous vibration monitoring systems. The system 600 includes the sensor device 302, the one or more sensor devices 304$_{1-N}$ and a machine 602. The sensor device 302 can include the sensor component 102. Furthermore, the machine 602 can be associated with the mechanical element 104. For example, the machine 602 can include the mechanical element 104. In another example, the machine 602 can be mechanically and/or electrically attached to the mechanical element 104 (e.g., the mechanical element 104 can be implemented separate from the machine 602. The sensor device 302 (e.g., the sensor component 102 of the sensor device 302) can be communicatively coupled to the machine 602 associated with the mechanical element 104. The sensor device 302 (e.g., the sensor component 102 of the sensor device 302) can also be in communication with the one or more sensor devices 304$_{1-N}$ via the network 306. The machine 602 can be an asset, an equipment, a vehicle, a device or another type of machine. Furthermore, the mechanical element 104 can be a moveable part (e.g., a rotating part) of the machine 602. The machine can be associated with an aviation system, a vehicle system, a health management system, an industrial system, a manufacturing system, a factory system, an energy management system, a power grid system, a water supply system, a transportation system, a healthcare system, a refinery system and/or another technological system. In one example, the mechanical element 104 can rotate to facilitate transmission of power to the machine 602.

Figure 7:
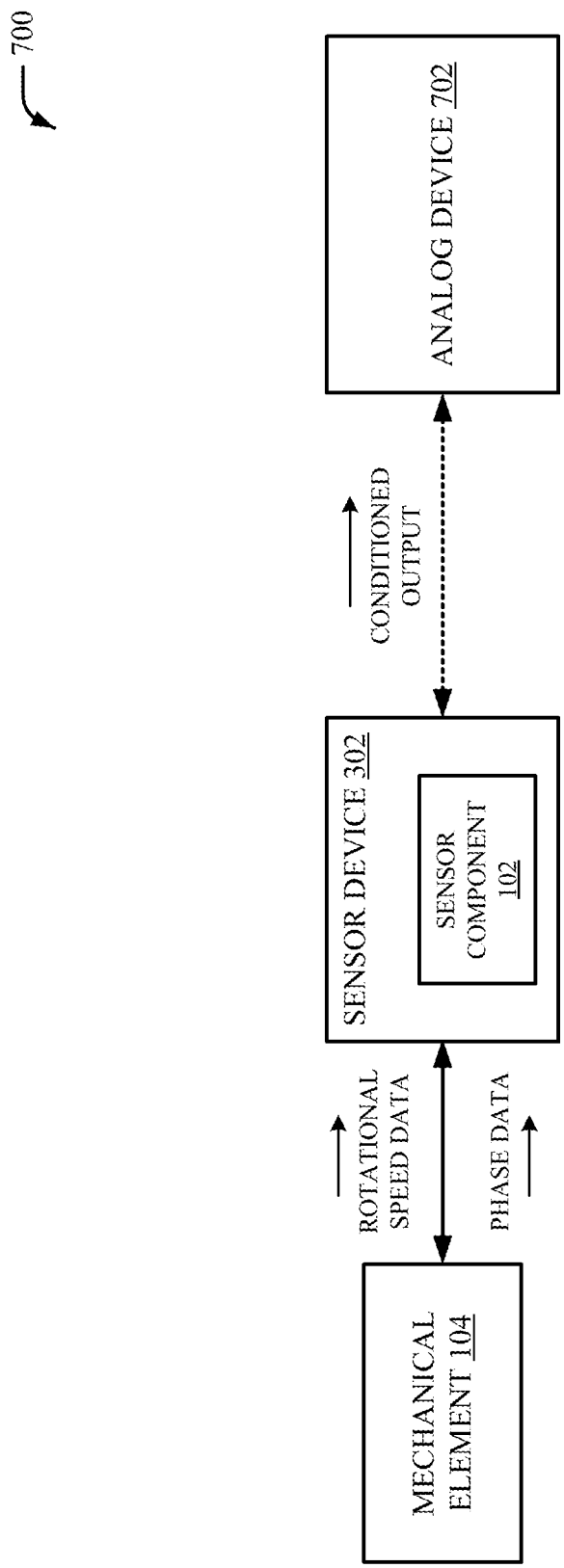
FIG. 7 illustrates an example system for conditioning a signal based on rotational data associated with a mechanical element, in accordance with various aspects and implementations described herein.

Referring now to FIG. 7, there is illustrated a non-limiting implementation of a system 700 in accordance with various aspects and implementations of this disclosure. The system 700 includes the mechanical element 104, the sensor device 302 and an analog device 702. The sensor device 302 can include the sensor component 102. Furthermore, the sensor device 302 (e.g., the sensor component 102 of the sensor device 302) can be communicatively coupled to the mechanical element 104. The sensor device 302 (e.g., the sensor component 102 of the sensor device 302) can also be communicatively coupled to the analog device 702. The analog device 702 can be a device that receives analog input. In one example, the analog device 702 can be an analog sensor device. In another example, the analog device 702 can be an analog measurement device (e.g., an analog tachometer device). In an embodiment, the sensor component 102 of the sensor device 302 (e.g., the analog measurement component 106 of the sensor component 102) can generate conditioned output (e.g., CONDITIONED OUTPUT shown in FIG. 7) based on the rotational speed data and/or the phase data associated with the mechanical element 104. The conditioned output can be, for example, an conditioned analog signal. In one example, the conditioned output can be a tachometer pulse signal (e.g., a conditioned tachometer pulse signal). The sensor component 102 of the sensor device 302 (e.g., the communication component 110 of the sensor component 102) can transmit the conditioned output to the analog device 702. In one example, the analog device 702 can display the conditioned output via an analog dial of the analog device 702 or a digital display of the analog device 702.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 8:
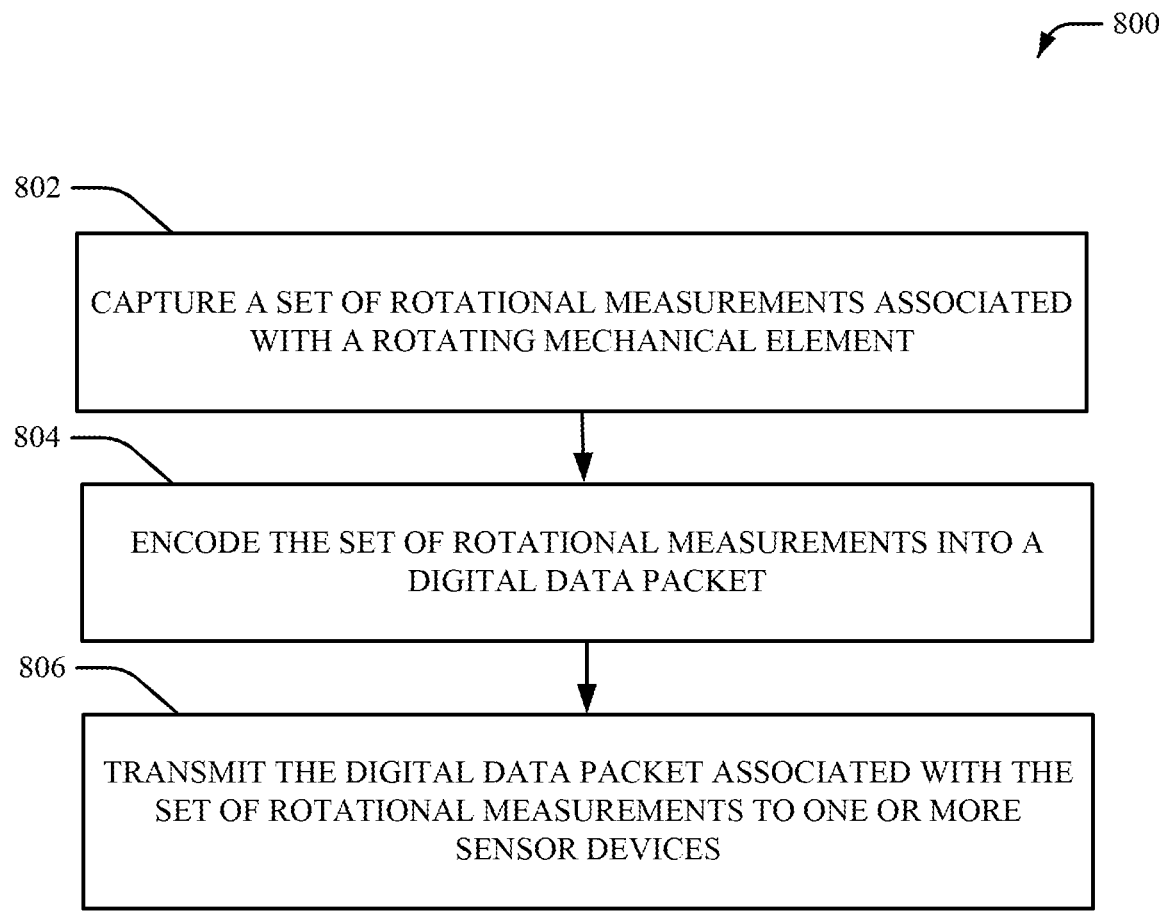
FIG. 8 depicts a flow diagram of an example method for generating and/or encoding rotational data for a rotating mechanical element, in accordance with various aspects and implementations described herein.
Figure 9:
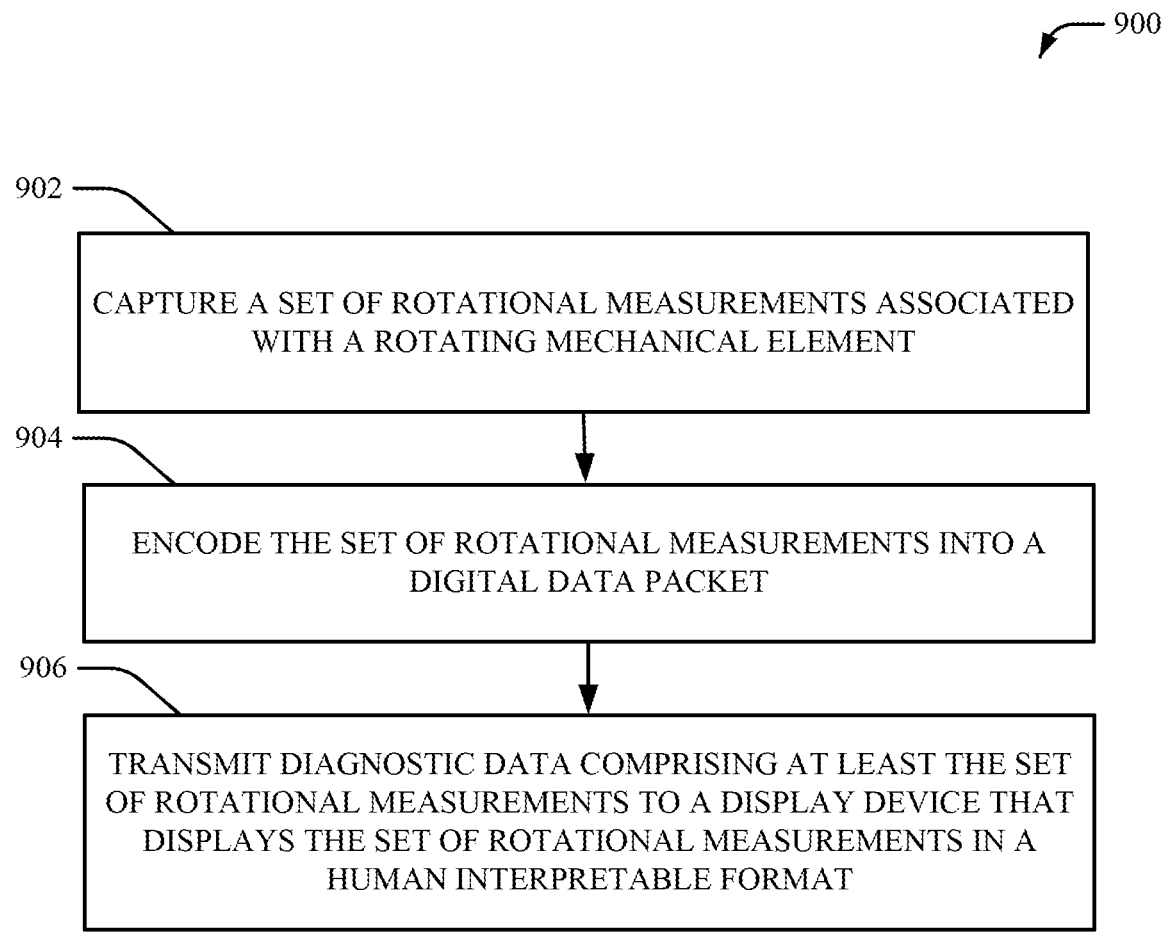
FIG. 9 depicts a flow diagram of an example method for monitoring rotational data for a rotating mechanical element, in accordance with various aspects and implementations described herein.
Figure 10:
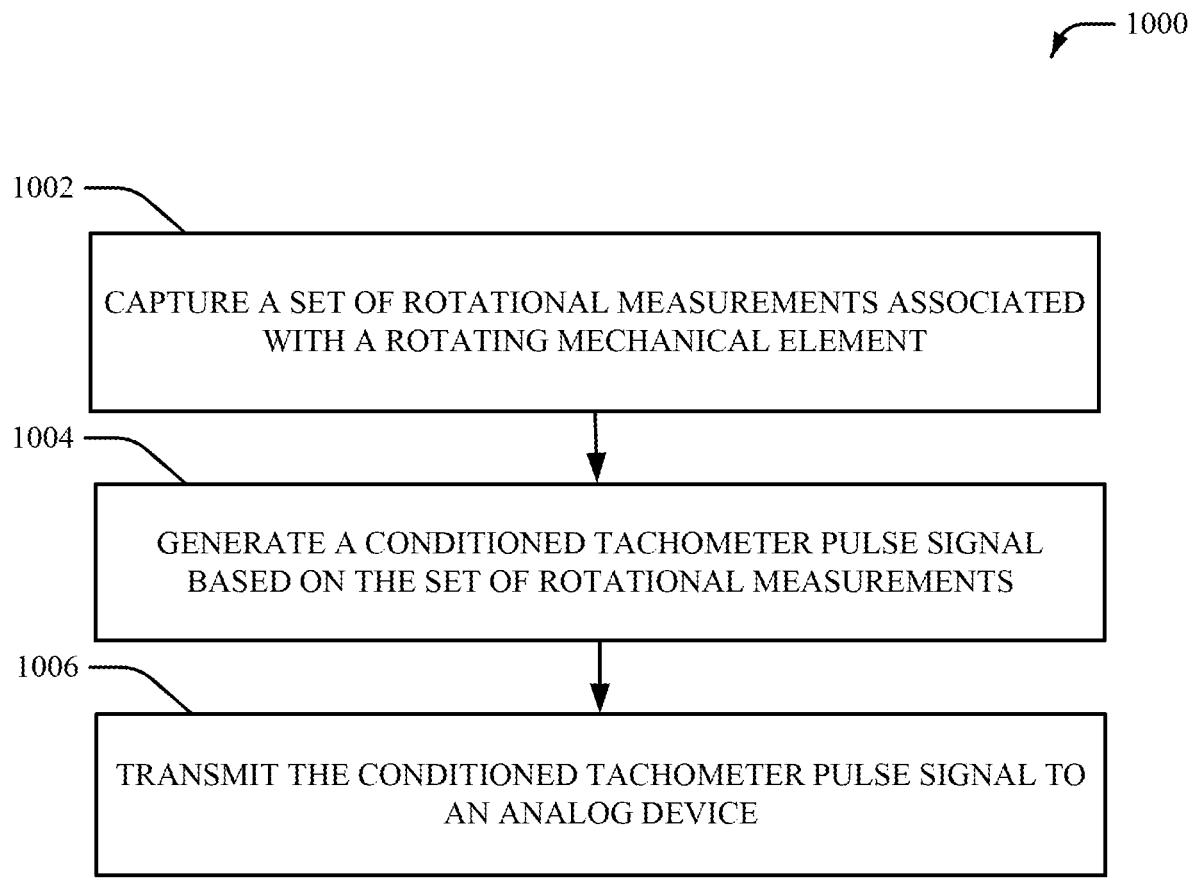
FIG. 10 depicts a flow diagram of an example method for conditioning a signal associated with a rotating mechanical element, in accordance with various aspects and implementations described herein.

FIGS. 8-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Referring to FIG. 8, there illustrated is a methodology 800 for generating and/or encoding rotational data for a rotating mechanical element, according to an aspect of the subject innovation. In an embodiment, the methodology 800 can be associated with the sensor component 102. As an example, the methodology 800 can be utilized in various applications, such as, but not limited to, a monitoring system (e.g., a synchronous vibration monitoring system), a sensor system, an aviation system, a vehicle system, a health management system, an industrial system, a manufacturing system, a factory system, an energy management system, a power grid system, a water supply system, a transportation system, a healthcare system, a refinery system, etc. At 802, a set of rotational measurements associated with a rotating mechanical element is captured (e.g., by analog measurement component 106). The set of rotational measurements can be measured, for example, based on a reference point associated with the rotating mechanical element. The set of rotational measurements can be a set of analog rotational measurements. Furthermore, the set of rotational measurements can be associated with rotational speed for the rotating mechanical element and/or phase of the rotating mechanical element. In one example, the set of rotational measurements can be a set of reference point measurements associated with the rotating mechanical element. The set of reference point measurements can be captured during a defined interval of time.

At 804, the set of rotational measurements is encoded (e.g., by encoder component 108) into a digital data packet. For instance, rotational speed for the rotating mechanical element and/or phase of the rotating mechanical element can be encoded into the digital data packet. In one example, the set of reference point measurements can be encoded as a block of data in the digital data packet.

At 806, the digital data packet associated with the set of rotational measurements is transmitted (e.g., by communication component 110) to one or more sensor devices. For instance, the digital data packet that includes rotational speed for the rotating mechanical element and/or phase of the rotating mechanical element can be transmitted to the one or more sensor devices. In one example, the digital data packet that includes the set of reference point measurements can be transmitted to the one or more sensor devices. The digital data packet associated with the set of rotational measurements can be transmitted to the one or more sensor devices via a digital network. The one or more sensor devices can be in communication with a system associated with the methodology 800. In an aspect, the one or more sensor devices can employ the digital data packet associated with the set of rotational measurements as input for further processing associated with the rotating mechanical element. In an embodiment, the digital data packet associated with the set of rotational measurements can be transmitted based on control data received from a control device. The control device can be in communication with a system associated with methodology 800 and/or the one or more sensor devices. In an embodiment, the methodology 800 can include generating analysis data based on analysis of the set of rotational measurements. Additionally, the methodology 800 can include transmitting the analysis data to a display device that displays the set of rotational measurements in a human interpretable format.

Referring to FIG. 9, there illustrated is a methodology 900 for monitoring rotational data for a rotating mechanical element, according to an aspect of the subject innovation. In an embodiment, the methodology 900 can be associated with the sensor component 102. As an example, the methodology 900 can be utilized in various applications, such as, but not limited to, a monitoring system (e.g., a synchronous vibration monitoring system), a sensor system, an aviation system, a vehicle system, a health management system, an industrial system, a manufacturing system, a factory system, an energy management system, a power grid system, a water supply system, a transportation system, a healthcare system, a refinery system, etc. At 902, a set of rotational measurements associated with a rotating mechanical element is captured (e.g., by analog measurement component 106). The set of rotational measurements can be measured, for example, based on a reference point associated with the rotating mechanical element. The set of rotational measurements can be a set of analog rotational measurements. Furthermore, the set of rotational measurements can be associated with rotational speed for the rotating mechanical element and/or phase of the rotating mechanical element. In one example, the set of rotational measurements can be a set of reference point measurements associated with the rotating mechanical element. The set of reference point measurements can be captured during a defined interval of time.

At 904, the set of rotational measurements is encoded (e.g., by encoder component 108) into a digital data packet. For instance, rotational speed for the rotating mechanical element and/or phase of the rotating mechanical element can be encoded into the digital data packet. In one example, the set of reference point measurements can be encoded as a block of data in the digital data packet.

At 906, diagnostic data comprising at least the set of rotational measurements is transmitted (e.g., by communication component 110) to a display device that displays the set of rotational measurements in a human interpretable format. For instance, the diagnostic data can be generated based on and/or can include rotational speed for the rotating mechanical element and/or phase of the rotating mechanical element. In one example, the diagnostic data can be generated based on and/or can include the set of reference point measurements. The diagnostic data can be transmitted to the display device via a digital network. The display device can be in communication with a system associated with the methodology 900. The display device can be associated with a display, a monitor, a user interface and/or a web browser. Furthermore, the display device can be a computing device and/or can be included in a computing device such as, but not limited to, a smart device, a smart phone, a mobile device, a handheld device, a tablet, a computer, a desktop computer, a laptop computer, a monitor device, a portable computing device or another type of computing device. The display device can render a user interface for presentation of the diagnostic data. For instance, a user interface rendered on the display device can present content associated with the diagnostic data. In one example, the display device can present one or more graphical elements associated with the diagnostic data.

Referring to FIG. 10, there illustrated is a methodology 1000 for conditioning a signal associated with a rotating mechanical element, according to an aspect of the subject innovation. In an embodiment, the methodology 1000 can be associated with the sensor component 102. As an example, the methodology 1000 can be utilized in various applications, such as, but not limited to, a monitoring system (e.g., a synchronous vibration monitoring system), a sensor system, an aviation system, a vehicle system, a health management system, an industrial system, a manufacturing system, a factory system, an energy management system, a power grid system, a water supply system, a transportation system, a healthcare system, a refinery system, etc. At 1002, a set of rotational measurements associated with a rotating mechanical element is captured (e.g., by analog measurement component 106). The set of rotational measurements can be measured, for example, based on a reference point associated with the rotating mechanical element. The set of rotational measurements can be a set of analog rotational measurements. Furthermore, the set of rotational measurements can be associated with rotational speed for the rotating mechanical element and/or phase of the rotating mechanical element. In one example, the set of rotational measurements can be a set of reference point measurements associated with the rotating mechanical element. The set of reference point measurements can be captured during a defined interval of time.

At 1004, a conditioned tachometer pulse signal is generated (e.g., by analog measurement component 106) based on the set of rotational measurements. For instance, a waveform of a tachometer pulse signal can be modified based on the set of rotational measurements to generate the conditioned tachometer pulse signal. The conditioned tachometer pulse signal can be, for example, an conditioned analog tachometer pulse signal. In one example, a tachometer pulse signal can be conditioned based on rotational speed for the rotating mechanical element and/or phase of the rotating mechanical element to generate the conditioned tachometer pulse signal. In another example, a tachometer pulse signal can be conditioned based on the set of reference point measurements to generate the conditioned tachometer pulse signal.

At 1006, the conditioned tachometer pulse signal is transmitted (e.g., by communication component 110) to an analog device. For example, the conditioned tachometer pulse signal can be provided to the analog device. In one example, the analog device can display analog data associated with the conditioned tachometer pulse signal via an analog dial of the analog device or a digital display of the analog device.

Figure 11:
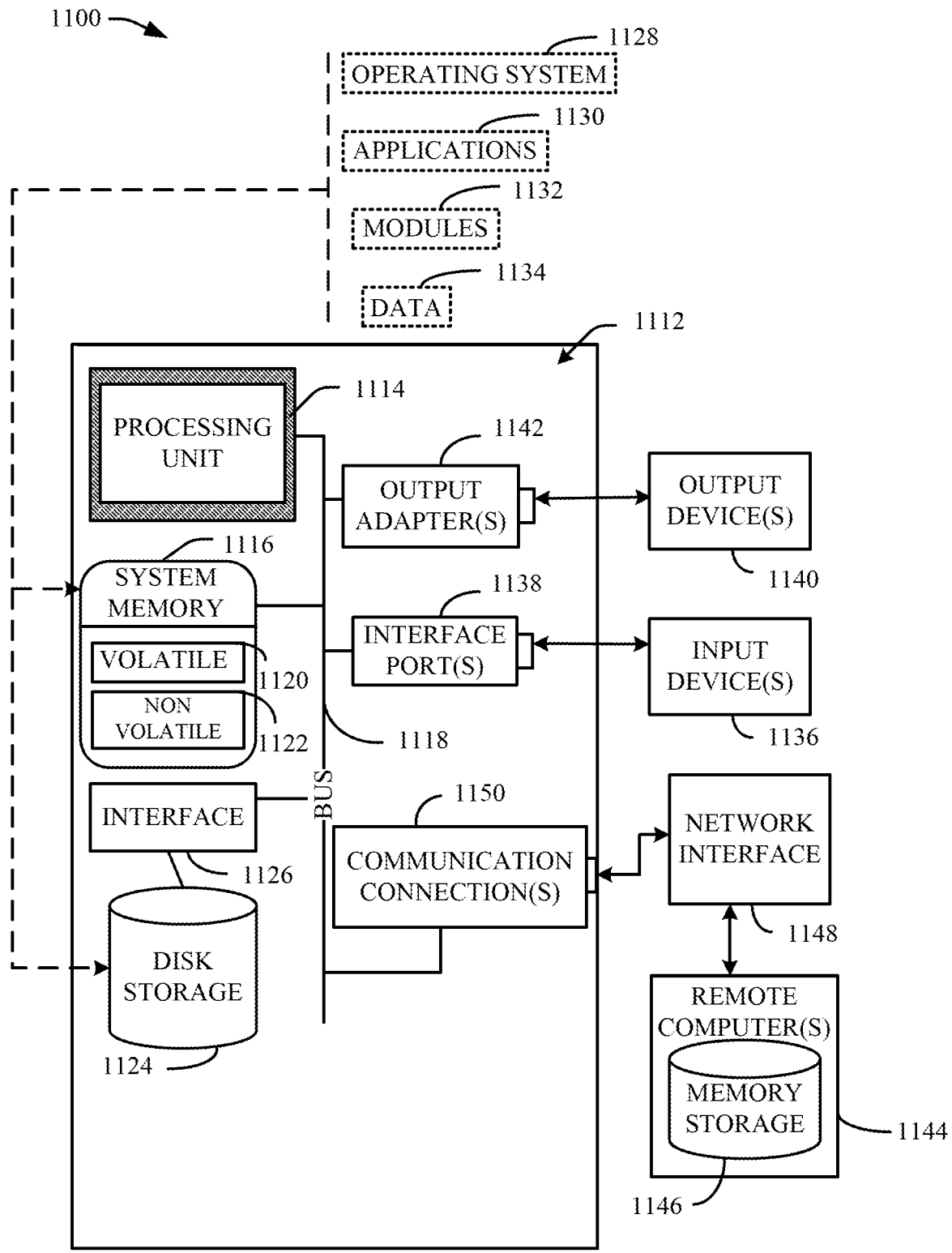
FIG. 11 is a schematic block diagram illustrating a suitable operating environment.
Figure 12:
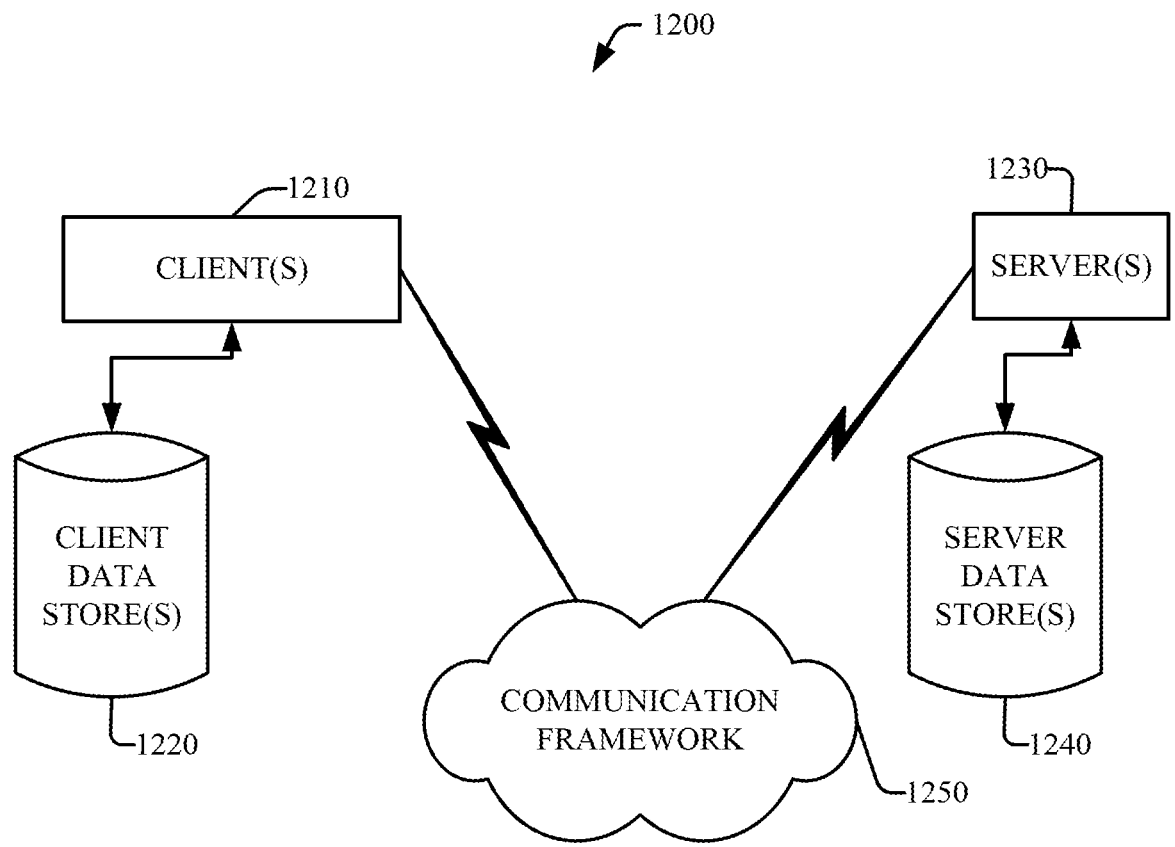
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable environment 1100 for implementing various aspects of this disclosure includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RANI (FeRAM). Volatile memory 1120 includes random access memory (RAM), which acts as external cache memory. By way of illustration and not limitation, RAM is available in many forms such as static RANI (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/non-volatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 with which the subject matter of this disclosure can interact. The sample-computing environment 1200 includes one or more client(s) 1210. The client(s) 1210 can be hardware and/or software (e.g., threads, processes, computing devices). The sample-computing environment 1200 also includes one or more server(s) 1230. Thus, sample-computing environment 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The sample-computing environment 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RANI) (e.g., ferroelectric RANI (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL- DRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A sensor system, comprising:
   a memory that stores computer executable components;
   a processor that executes the computer executable components stored in the memory, wherein the computer executable components comprise:
   an analog measurement component that measures, based on a time reference, analog data indicative of rotational speed data and phase data associated with a mechanical element that rotates, wherein the time reference is synchronized across the sensor system and a group of sensor devices;
   an encoder component that encodes the time reference, the analog data indicative of the rotational speed data and the phase data into a digital data packet in a format that enables transmission via a digital network;
   an analysis component that determines a magnitude of the rotational speed data based on the analog data as compared to a defined magnitude threshold, resulting in analysis data, wherein the analysis data comprises configuration data and error checking data that comprise information indicative of rate of change of time between phase reference measurements included in a set of reference point measurements; and
   a communication component that transmits, based on control data received from a control device, the analysis data and the digital data packet associated with the data indicative of the rotational speed data and the phase data to one or more sensor devices of the group of sensor devices in communication with the sensor system, wherein the communication component transmits the digital data packet via the digital network, and wherein the one or more sensor devices being communicatively coupled via the digital network and controlled by the control device.

2. The sensor system of claim 1, wherein the analog measurement component determines a set of reference point measurements associated with the mechanical element during a defined interval of time, and wherein the phase data comprises the set of reference point measurements.

3. The sensor system of claim 1, wherein the analog measurement component measures the data indicative of the rotational speed data and the phase data based on a clock signal provided to the sensor system and the one or more sensor devices, and wherein the clock signal facilitates synchronization of processing between the sensor system and the one or more sensor devices.

4. The sensor system of claim 1, wherein the communication component transmits diagnostic data that comprises at least the data indicative of the rotational speed data and the phase data to a display device, and wherein the diagnostic data displayed on the display device is in a human interpretable format.

5. The sensor system of claim 1, wherein the analog measurement component generates a tachometer pulse signal based on the data indicative of the rotational speed data and the phase data, and wherein the communication component transmits the tachometer pulse signal to an analog measurement device.

6. The sensor system of claim 1, wherein the communication component transmits the digital data packet associated with the data indicative of the rotational speed data and the phase data to the one or more sensor devices to facilitate measurement of other data that is different than the data indicative of the rotational speed data and the phase data.

7. The sensor system of claim 1, wherein the analysis component generates a snapshot of a digitized analog signal generated by the encoder component, wherein the snapshot comprises a set of digital rotational data for the mechanical element over a defined interval of time based on the time reference.

8. A method, comprising:
   capturing, by a system comprising a processor, a set of rotational measurements associated with a rotating mechanical element based on a time reference synchronized across a group of sensor devices, wherein the set of rotational measurements comprise analog data indicative of rotational speed of the rotating mechanical element and phase data associated with the rotating mechanical element;
   encoding, by the system, the time reference and the set of rotational measurements into a digital data packet formatted for transmission over a digital network;
   determining a magnitude of the rotational speed data based on the analog data as compared to a defined magnitude threshold, resulting in analysis data, wherein the analysis data comprises configuration data and error checking data, which comprise information indicative of rate of change of time between phase reference measurements included in a set of reference point measurements; and
   transmitting, by the system, the analysis data and the digital data packet associated with the set of rotational measurements to one or more sensor devices of the group of sensor devices in communication with the system via the digital network and based on control data received from a control device, wherein the one or more sensor devices are communicatively coupled via the digital network and controlled by the control device.

9. The method of claim 8, wherein the capturing set of rotational measurements comprises capturing one or more reference point measurements associated with the rotating mechanical element during a defined interval of time.

10. The method of claim 8, wherein the capturing the set of rotational measurements comprises capturing the set of rotational measurements based on a clock signal provided to the system and the one or more sensor devices, wherein the clock signal facilitates synchronization of processing between the system and the one or more sensor devices.

11. The method of claim 8, further comprising:
transmitting, by the system, diagnostic data comprising at least the set of rotational measurements to a display device that displays the set of rotational measurements in a human interpretable format.

12. The method of claim 8, further comprising:
generating, by the system, a conditioned tachometer pulse signal based on the set of rotational measurements; and
transmitting, by the system, the conditioned tachometer pulse signal to an analog device.

13. The method of claim 8, further comprising:
generating, by the system, the analysis data based on analysis of the set of rotational measurements; and
transmitting, by the system, the analysis data to a display device that displays the set of rotational measurements in a human interpretable format.

14. A non-transitory computer readable medium comprising instructions that, in response to execution, cause a system comprising a processor to perform operations, comprising:
measuring, based on a synchronized time reference, rotational data associated with a rotating mechanical element, wherein the rotational data comprises analog data indicative of a rotational speed and phase data;
encoding the synchronized time reference and the rotational data into a digital data packet configured to be transmitted via a digital network, wherein the synchronized time reference is synchronized across the digital network;
determining a magnitude of the rotational speed data based on the analog data as compared to a defined magnitude threshold, resulting in analysis data, wherein the analysis data comprises configuration data and error checking data, and wherein the configuration data and error checking data comprise information indicative of rate of change of time between phase reference measurements included in a set of reference point measurements; and
based on control data received from a control device, transmitting, via the digital network, the analysis data and the digital data packet that includes the rotational data to one or more sensor devices in communication with the system, wherein the one or more sensor devices are controlled by the control device, and wherein the one or more sensor devices are communicatively coupled to one another via the digital network.

15. The non-transitory computer readable medium of claim 14, wherein the measuring the rotational data comprises measuring the data indicative of the rotational speed data and the phase data associated with the rotating mechanical element.

16. The non-transitory computer readable medium of claim 14, wherein the measuring the rotational data comprises measuring a set of reference points associated with the rotating mechanical element during a defined period of time.

17. The non-transitory computer readable medium of claim 14, wherein the measuring the rotational data comprises measuring the rotational data based on a clock signal provided to the system and the one or more sensor devices, and wherein the clock signal facilitates synchronization of processing between the system and the one or more sensor devices.

18. The non-transitory computer readable medium of claim 14, wherein the operations further comprise:
transmitting diagnostic data comprising at least the rotational data to a display device that displays the rotational data in a human interpretable format.

19. The non-transitory computer readable medium of claim 14, wherein the operations further comprise:
conditioning a tachometer pulse signal based on the rotational data.

* * * * *